(12) United States Patent
Toda

(10) Patent No.: US 7,023,579 B2
(45) Date of Patent: Apr. 4, 2006

(54) INFORMATION PROCESSING APPARATUS, INFORMATION PROCESSING METHOD, AND MEMORY MEDIUM STORING PRINT CONTROL PROGRAM THEREIN

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 09/779,642

(22) Filed: Feb. 9, 2001

(65) Prior Publication Data

US 2001/0024288 A1  Sep. 27, 2001

(30) Foreign Application Priority Data

Feb. 10, 2000  (JP) .............................. 2000-033757

(51) Int. Cl.
*G06F 15/00* (2006.01)

(52) U.S. Cl. ..................... 358/1.9; 358/1.15; 358/1.17; 358/1.11; 395/114; 395/115; 395/116

(58) Field of Classification Search ................ 345/505; 358/1.15, 1.17, 1.18, 1.9; 395/114, 115, 395/116

See application file for complete search history.

(56) References Cited

U.S. PATENT DOCUMENTS

| | | | |
|---|---|---|---|
| 5,745,664 A * | 4/1998 | Nomura et al. ............ 358/1.18 |
| 5,778,160 A * | 7/1998 | Smith .......................... 358/1.9 |
| 5,991,516 A * | 11/1999 | Desmond et al. .......... 358/1.17 |
| 6,067,097 A * | 5/2000 | Morita et al. ............... 345/505 |
| 6,084,688 A * | 7/2000 | Stumbo et al. ............ 358/1.17 |
| 6,621,588 B1 * | 9/2003 | Shimada .................... 358/1.15 |

* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

In case of temporarily spooling an intermediate language by a printer driver, a high speed print can be performed by suppressing a size and the number of holding data. The printer driver adds a tag of each draw object type to information of a draw command received through a DDI function and holds the resultant information into a primary buffer together with attributes such as draw position information, color information, pattern information, and draw logic information. When the information is held into the primary buffer, if there is a draw object which has already been held, if the types and the draw attributes of the draw objects are identical, the draw object is additionally registered into the primary buffer. If one of "type is different", "data cannot be fully stored into the primary buffer", "draw attribute changes", and "page process is completed" is satisfied, a PDF (Page Data File) is generated from the draw object which has already been held in the primary buffer and spooled.

24 Claims, 11 Drawing Sheets

INFORMATION PROCESSING APPARATUS, INFORMATION PROCESSING METHOD, AND MEMORY MEDIUM STORING PRINT CONTROL PROGRAM THEREIN

BACKGROUND OF THE INVENTION

1. Field of the Invention

The invention relates to an information processing apparatus, an information processing method, and a memory medium in which a print control program has been stored. More particularly, the invention relates to an information processing apparatus which is suitable for controlling, for example, a printer through a predetermined communication medium and functions as a host computer and to an information processing method and a memory medium in which a printer driver program which operates on the information processing apparatus has been stored.

2. Related Background Art

First, an information processing method in a conventional print system and a flow of processes will be described with reference to FIG. 2.

According to the conventional print system, generally, as shown in FIG. 2, a host computer and a laser beam printer are connected through parallel communication means such as a Centronics interface or through network communication means.

On the host computer side, application software 201 such as word processor or spreadsheet operates on what is called basic software such as Windows (registered trademark of Microsoft Corporation in U.S.A.). In case of printing on the basis of such an application, a function of a graphic sub-system 202 among several sub-systems which are provided by the basic software is used. For example, the graphic sub-system is called GDI (Graphic Device Interface) 2021 in Windows and executes processes of image information for a display or a printer.

The GDI 2021 dynamically links a module called a device driver in order to absorb dependency of each device such as display or printer and executes an outputting process to each device. The module for the printer is called a printer driver 2023.

For the printer driver 2023, a function group called DDI 2022 (Device Driver Interface) which has previously been determined to be installed into the device driver needs to be prepared in accordance with its ability, function, or the like. With respect to an API (Application Programming Interface) call of the application, the GDI 2021 converts data into data for the device driver, the DDI function group 2022 is properly called from the GDI 2021, and a predetermined printing process is executed. The GDI 2021 sequentially processes a print request from the application through the printer driver 2023. Generally, a PDL command is generated in the printer driver 2023 existing in the mechanism of the OS as mentioned above or a rendering process is executed as an image mode.

In order to individually perform a banding process in the image mode or realize a function which is not supported by the OS, that is, a function such as page handling process in a reverse order print mode (a last-come first print mode) or the like or automatic switching of a processing mode, the printer driver 2023 executes only generation of an intermediate language file (PDF 2031) from a received draw command, and a despooler 2032 of a spool sub-system 203 as an application reads the PDF 2031 and adds additional functions.

Processes of the printer driver are mainly classified into two kinds of a PDL mode (refer to 2033) and an image mode (refer to 2034 to 2036).

The PDL mode 2033 is used in the case where a printer side has a controller which can process a control command called PDL (Printer Description Language). Immediately after the PDF 2031 is converted into the command of the PDL, the command is sent to a printing apparatus (printer) 100 through an interface (I/F) 2038.

As processes in the PDL mode, since commands are merely sequentially generated from the received data by the DDI 2022, it is regarded that they are light processes for the driver. In the PDL mode type, if analyzing ability of the PDL command of the printer is high, data having a high abstract degree received from the GDI 2021 can be sent as it is, there is a feature such that a print speed in the normal page print to mainly print characters is high irrespective of an output gradation.

However, if it is intended to output a complicated figure or an image of a high resolution and a high gradation by an application of the graphics system, a size of PDL command increases and a transfer speed of data and a processing speed of the printer deteriorate. Theoretically, there is not an upper limit of the size of PDL command.

According to the image mode, a print image is developed on a band memory space held on the printer driver side, converted into a form in which the print image can be directly printed by the printer, and the converted image data is transmitted to the printer, thereby printing it.

According to the image mode type, since a size of transfer data is determined by a draw area and the number of output gradations, there is a feature such that a transfer speed of data and a processing time of the printer in case of a simple page and those of a complicated page are not so different. Therefore, even in case of a page which takes a long processing time in the PDL mode, it can be printed at a relatively high speed. However, even in case of a simple page of only characters, it is difficult to make the printer operative in accordance with a throughput of an engine.

When the PDF 2031 is despooled, the despooler 2032 uses a band memory divided into a proper height, separately sends draw commands regarding draw positions to modules 2034 to 2036 for the image mode a plurality of number of times, and executes a drawing process. Generated bit map data is sent to the printer 100 through the I/F 2038 every band.

As a feature of the image mode, a point that a drawing processing speed of a high resolution color image or complicated graphics data is high can be mentioned. However, also with respect to characters or a simple figure, since image data in a whole draw area is generated at an output resolution and an output gradation and sent as a print command, such an image mode is not suitable for the high speed print of a page of a high resolution and a high gradation.

Since the drawing process is performed in both of the image mode and the PDL mode, a memory area for drawing corresponding to one page is necessary on the host computer side in the image mode and necessary on the printer side in the PDL mode. In a color printer, however, a capacity of 96 Mbytes is necessary if it is intended to assure a memory of a capacity corresponding to 600 dpi of 8 bits per each color of RGB and a full page of the A4 size. At present, it is difficult to assure such a memory even in a host machine. Therefore, in the drawing process of the color printer, a color space of 1, 2, or 4 bits per each color of YMCK as an output format is used and a band memory in which a page is further divided into several areas is used, thereby reducing the capacity of the memory for the drawing process.

The process for dividing one page into a plurality of bands and performing the drawing process as mentioned above is called a banding process. With respect to the banding process, the draw commands of one page are held on the printer side in case of the PDL mode and on the host machine side in case of the image mode and only a print command necessary for each band is processed, thereby realizing the drawing process of each band.

However, among the draw commands which are sent through the DDI 2022, there is a command such that a 1-line draw function (Windows9X; SCANLINE of an Output function) and a rectangle painting function of a few pixels (Windows9X; RECTANGLE of the Output function) are called many times and a figure drawing process of a complicated shape is executed. In such a case, if a spooling process of one page is executed by the printer driver, a problem such that the number of intermediate languages and the data size increase and they become factors of reduction of the processing speed occurs.

SUMMARY OF THE INVENTION

In consideration of the above problems, therefore, it is an object of the invention to provide an information processing apparatus and an information processing method, in which even in case of temporarily spooling an intermediate language by a printer driver, a high speed print can be performed by reducing a size and the number of holding data.

To accomplish the above object, according to the invention, there is provided an information processing apparatus comprising: memory means for storing inputted print command information; and synthesizing means for, when the print command information is stored in the memory means, if an attribute of print command information which has already been stored is identical to that of the print command information and there is a memory area which can be stored in the memory means, synthesizing the print command information which has already been stored and the print command information and allowing synthesized information to be stored in the memory means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of the invention will be described in detail hereinbelow with reference to the drawings.

Figure 1:
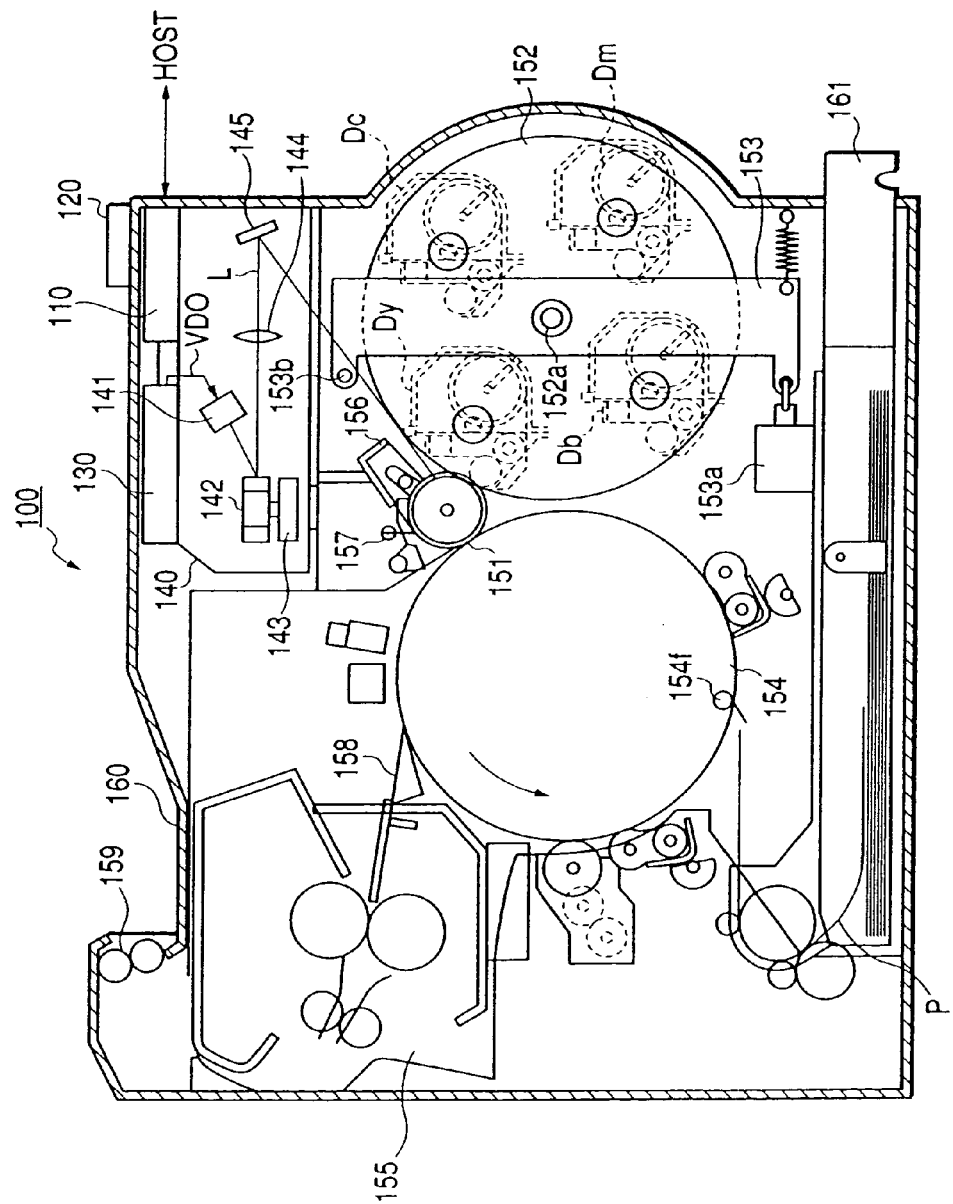
FIG. 1 is a side sectional view showing a structure of a color laser beam printer (LBP) to which the invention is applied.
Figure 2:
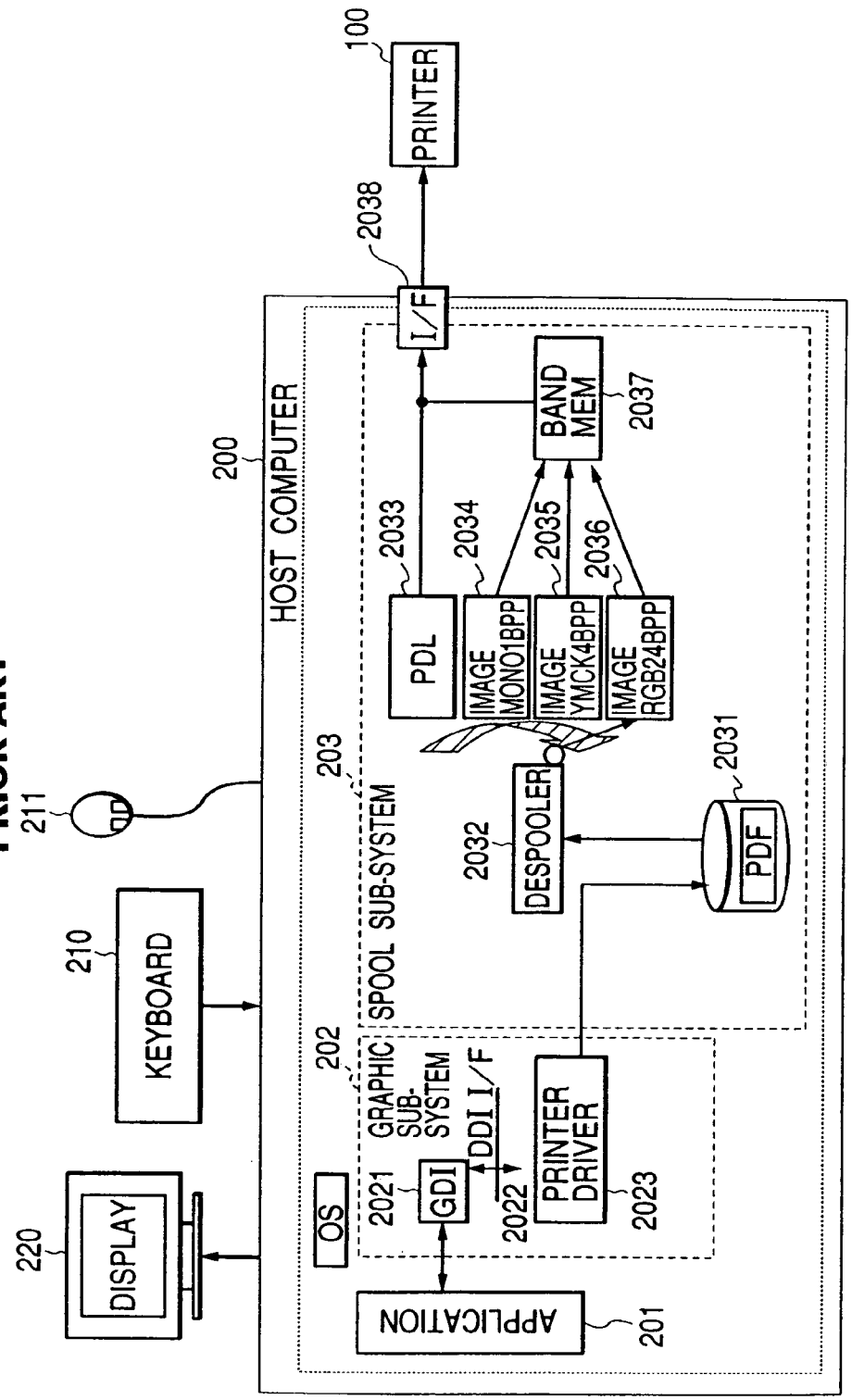
FIG. 2 is a conceptual diagram showing a conventional drawing method.

FIG. 1 shows a side sectional view of a color laser beam printer (hereinafter, referred to as "color LBP") included in a print system to which the invention is applied. That is, FIG. 1 is a side sectional view showing a structure of the color LBP which has a resolution of 600 dots/inch (dpi) and records an image on the basis of multivalue data in which each color component and each pixel are expressed by 8 bits.

In FIG. 1, reference numeral 100 denotes the color LBP (hereinafter, also referred to as a printer). The printer 100 receives and stores print information comprising print data (character codes, image data, and the like) and control codes which are supplied from a host computer or the like connected to the outside, generates a corresponding character pattern, image, or the like in accordance with the print information, and forms an image onto a recording paper as a memory medium.

Reference numeral 110 denotes a formatter controller for analyzing the print information supplied from the host computer, executing a generating process of the print image, and controlling the color LBP 100. The formatter controller 110 is connected to an operation panel 120 on which switches, an LED display, and the like for notifying the user of the operation which is executed by the user and notifying the user of a status of the printer are arranged. The operation panel is arranged as a part of an external surface component of the printer 100. A final print image generated by the formatter controller 110 is sent as a video signal to an output controller 130. The output controller 130 receives detection signals indicative of the statuses from various sensors (not shown) of the printer 100, outputs control signals to an optical unit 140 and various driving system mechanism portions, and controls a printing process as a printer 100.

In the printer shown in FIG. 1, a front edge of a paper (transfer paper) P fed from a paper feed cassette 161 is gripped by a gripper 154f and held around an outer periphery of a transfer drum 154. A latent image of each color formed on a photosensitive drum 151 by the optical unit 140 is developed by each of color developers Dy, Dm, Dc, and Db of yellow (Y), magenta (M), cyan (C), and black (Bk) and transferred onto the paper on the outer periphery of the transfer drum a plurality of number of times, so that a multicolor image is formed. After that, the paper P is separated from the transfer drum 154, the image on the paper is fixed by a fixing unit 155, and the paper is delivered from a paper delivery unit 159 to a paper delivery tray 160.

Each of the developers Dy, Dm, Dc, and Db of each color has rotary fulcrum axes at both ends and held by a developer selecting mechanism 152 so that it is rotatable around the fulcrum axis as a rotational center. Thus, as shown in FIG. 1, each of the developers Dy, Dm, Dc, and Db has a construction such that its position can be maintained even if the developer selecting mechanism 152 is rotated around a rotary axis 152a as a center in order to select the developer. After the selected developer was moved to a developing position, a selecting mechanism holding frame 153 is stretched in the direction of the photosensitive drum 151 around a fulcrum 153b as a rotational center by a solenoid 153a and moved in the direction of the photosensitive drum 151, and a developing process is executed. Subsequently, the photosensitive drum 151 is uniformly charged to a predetermined polarity by a charging device 156. The print information developed as an image by the formatter controller 110 is converted into a video signal of the corresponding pattern and drives a semiconductor laser 141 through a laser driver. A laser beam emitted from the semiconductor laser 141 is on/off controlled in accordance with the inputted video signal. Further, the laser beam is turned to the right and left by a polygon mirror 142 which is rotated at a high speed by a scanner motor 143 and scans and exposes the surface of the photosensitive drum 151 through a polygon lens 144 and a reflecting mirror 145. Thus, an electrostatic latent image of the image pattern is formed on the photosensitive drum 151. Subsequently, an electrostatic latent image of, for example, the M (magenta) color is developed by the developer Dm of the M (magenta) color and a first toner image of the M (magenta) color is formed on the photosensitive drum 151.

The transfer paper P is fed at a predetermined timing. A transfer bias voltage of a polarity (for example, plus polarity) opposite to that of toner is applied to the transfer drum 154. The first toner image on the photosensitive drum 151 is transferred onto the transfer paper P. The transfer paper P is electrostatically adsorbed to the surface of the transfer drum 154. After that, the toner of the M (magenta) color remaining on the photosensitive drum 151 is removed by a cleaner 157, thereby preparing for steps of forming and developing a latent image of the next color.

Toner images of the second, third, and fourth colors are subsequently transferred in the order of C (cyan), Y (yellow), and Bk (black) by a procedure similar to that mentioned above. However, the operation upon transfer of each color differs from that in the preceding transfer with respect to a point that a bias voltage higher than that in the preceding operation is applied to the transfer drum 154. When the front edge portion of the transfer paper P on which the toner images of four colors have been multiplex-transferred approaches the separating position, a separating claw 158 approaches there, a tip of the claw is come into contact with the surface of the transfer drum 154, thereby separating the transfer paper P from the transfer drum 154. The separated transfer paper P is conveyed to the fixing unit 155, the toner image on the transfer paper is fixed here, and the paper is delivered onto the paper delivery tray 160.

The color laser beam printer in the embodiment outputs the image at a resolution of 600 dpi through the image forming steps as mentioned above. The printer to which the invention can be applied is not limited to the color LBP, but can be also applied to a color printer of another printing system such as ink jet printer, thermal printer, or the like.

The formatter controller 110 in the color LBP (printer) 100 will now be described with reference to FIG. 3. The formatter controller 110 is usually also called a PDL controller or the like and includes: an interface (I/F) 111 as connecting means for connecting to the host computer; a reception buffer 1121 for temporarily holding and managing reception data or the like; a transmission buffer 1122 for temporarily holding and managing transmission data or the like; a command analyzer 113 for analyzing the print data; a print controller 114; a drawer 115; and a page memory 116.

The interface (I/F) 111 is communicating means for transmitting and receiving the print data to/from a host computer 200 and enables communication which conforms with IEEE1284 as a communication protocol. In the embodiment, however, the invention is not limited to such communicating means but the connection can be also made by various protocols through a network, or communicating means which conforms with IEEE1394 can be also used. The print data received through the I/F 111 is successively stored in the reception buffer 1121 as memory means for temporarily holding the data and read out and processed as necessary by the command analyzer 113 or drawer 115.

The command analyzer 113 is constructed by a control program according to each PDL command system or a print job control language. The command analyzer 113 processes an analysis result of the print data such as character print, figure, image, or the like regarding the drawing by inputting an instruction to the drawer 115 and processes commands such as paper select command, reset command, and the like other than the draw command by inputting an instruction to the print controller 114.

The drawer 115 is a renderer for successively developing each draw object such as character or image into the page memory 116.

It is necessary to send page data to the color LBP shown in FIG. 1 by an area sequential manner of MCYK so as to be in time for an engine rotating process. However, in a standard state, all of the memory capacity necessary for such an operation is not assured but a memory as a band area of a fraction of one plane (1 or 2 bits/pixel) is assured, the band area is circularly used, and the image is processed synchronously with an engine speed. Usually, the page memory 116 is managed by the chase of the developing process by the YMCK renderer and the shipping of the video signal to the printer engine, namely, by what is called a banding control. However, if there is a memory of a sufficient capacity, an area where the data of one page can be developed can be also assured.

Generally, the formatter controller 110 is constructed by a computer system using a central processing unit (CPU), a read only memory (ROM), a random access memory (RAM), or the like. The processes in the respective sections can be also executed in a time-sharing manner under a multitask monitor (real-time OS) or can be also independently executed by preparing dedicated controller hardware every function.

The operation panel 120 is used for setting and displaying various statuses of the printer as mentioned above. The output controller 130 converts the contents in the page memory 116 into the video signal and transfers an image to a printer engine 150. The printer engine 150 is a print mechanism for forming a permanent visible image onto the recording paper on the basis of the received video signal and has already been mentioned in conjunction with FIG. 1.

The LBP printer 100 has been described above. A whole construction of a print system including a host computer 300 will now be described.

Figure 3:
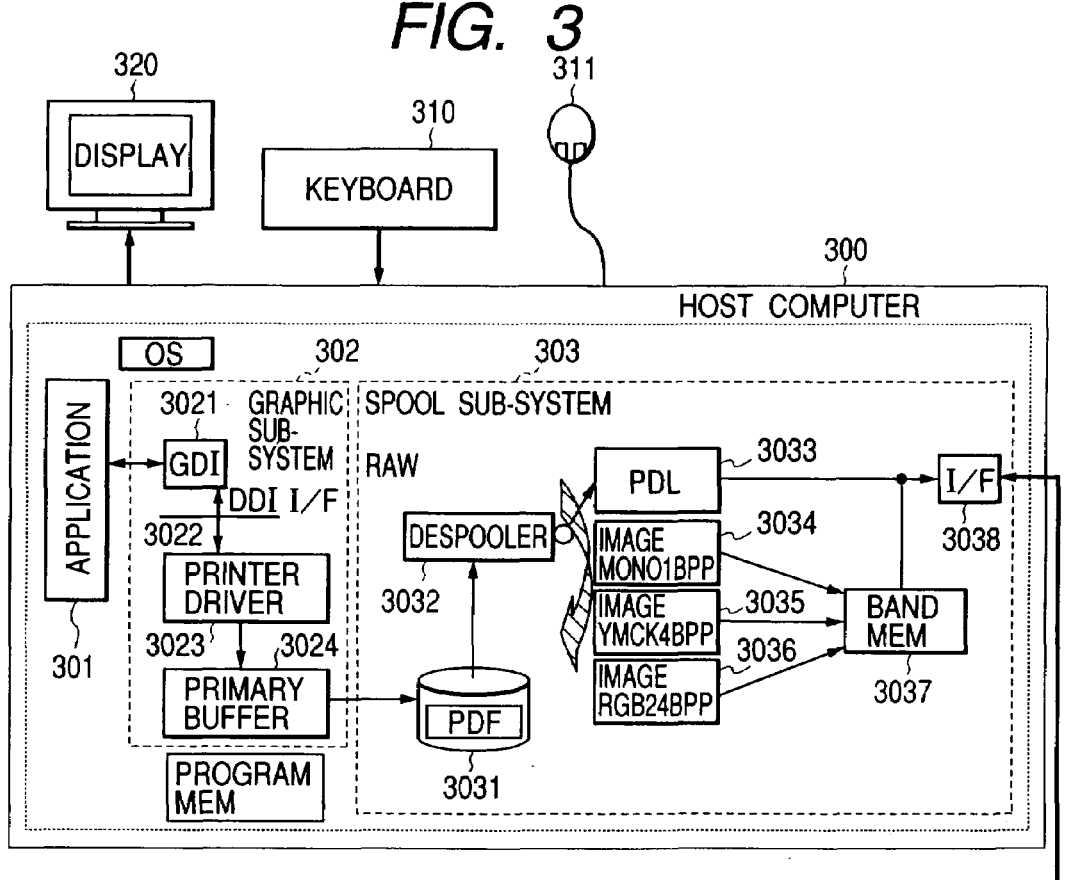
FIG. 3 is a block diagram showing a whole fundamental construction of a print system to which the invention is applied.

In FIG. 3, reference numeral 300 denotes the host computer for outputting print information comprising print data and control codes to the printer 100. The host computer 300 is constructed as one computer system in which a keyboard 310 as an input device, a mouse 311 as a pointing device, and a display monitor 320 as a display device are combined. It is assumed that the host computer 300 operates by the basic OS such as WindowsNT, Windows95(98), or the like.

An attention is paid only to functional portions regarding the embodiment with respect to the host computer side and the functions on the basic OS are mainly classified into: application software (application) 301; graphic sub-system 302; and a spool sub-system 303 including print information storing means and communicating means for communicating with the printer. The application 301 indicates, for example, application software which operates on basic software such as word processor, spreadsheet, or the like. The graphic sub-system 302 is constructed by: a Graphic Device Interface (hereinafter, referred to as GDI) 3021 as a part of the functions of the basic OS; and a printer driver 3023 as a device driver which is dynamically linked from the GDI.

The printer driver 3023 is called from the GDI through an interface such as DDI (Device Driver Interface) 3022 and executes processes according to the device every draw object. In the present system, the printer driver adds a tag of each draw object type to the information of the draw command received through the DDI function and holds the resultant information into a primary buffer 3024 together with attributes such as draw position information, color information, pattern information, and draw logic information.

A draw object (huge image data or the like) which cannot be fully stored into the primary buffer 3024.

When the draw object is held in the primary buffer 3024, if there is the draw object which has already been held, it is additionally registered into the primary buffer 3024 so long as the types and draw attributes of them are identical, respectively. If one of the conditions "the type differs", "data cannot be fully stored into the primary buffer", "the draw attribute changes", and "the page process is completed" is satisfied, a PDF (Page Data File) 3031 is generated from the draw object which has already been stored in the primary buffer 3024 and spooled.

The spool sub-system 303 is a sub-system that is peculiar to the printer device locating at the post stage of the graphic sub-system 302 and includes a despooler 3032. The despooler 3032 reads the PDF 3031 as print information storing means and executes a despooling process by designated translators for mode (3033 to 3036). A selected one of drivers (3033 to 3036) performs the image development by using a band memory 3037 if the operating mode is an image mode (3034 to 3036) and executes a converting process from a spool file into a PDL command if the mode is a PDL mode (3033), and the driver sends the data to the printer through an interface (I/F) 3038.

Although there is a case where the foregoing names and functional combination are slightly different in dependence on the basic OS, those names and combination do not cause a large problem so long as they are the modules which can be realized by each technical means mentioned in the embodiment. For example, the modules called spooler and spool file can be also realized by assembling processes into a module called a print queue in another OS.

Generally, in the host computer 300 including each of those functional modules, under the hardware such as central processing unit (CPU), read only memory (ROM), random access memory (RAM), hard disk drive (HDD), various input/output controllers (I/O), and the like, software called basic software controls them and under the basic software, application software and sub-system process of each of them operate as functional modules.

A PDL data compressing method using a primary buffer will now be described further in detail.

To explain the operation in the embodiment, a DDI of Windows95 (Windows98) will be first described.

In the DDI of Windows9X, as one of the functions of the graphics system, the following function is prepared.

Output(LPPDEVICE lpDestDev, WORD wStyle, WORD wCount, LPPOINT lpPoints, LPPEN lpPPen, LPPBRUSH lpPBrush, LPDRAWMODE lpDrawMode, LPRECT lpClipRect)

According to this function, a meaning of data which is sent changes in dependence on a value of wStyle of the second argument. For example, if OS_RECTANGLE has been set, 2 is certainly set into wCount. According to this function, first coordinate information (X, Y) shown by lpPoints of the fourth argument indicates an upper left point of a rectangle, next coordinate information (X, Y) shows a lower right point, and it is demanded that the inside of a rectangle having a diagonal line defined by those two points is drawn by a color shown by lpPBrush, a pattern, and a frame line shown by lpPPen.

Figure 10:
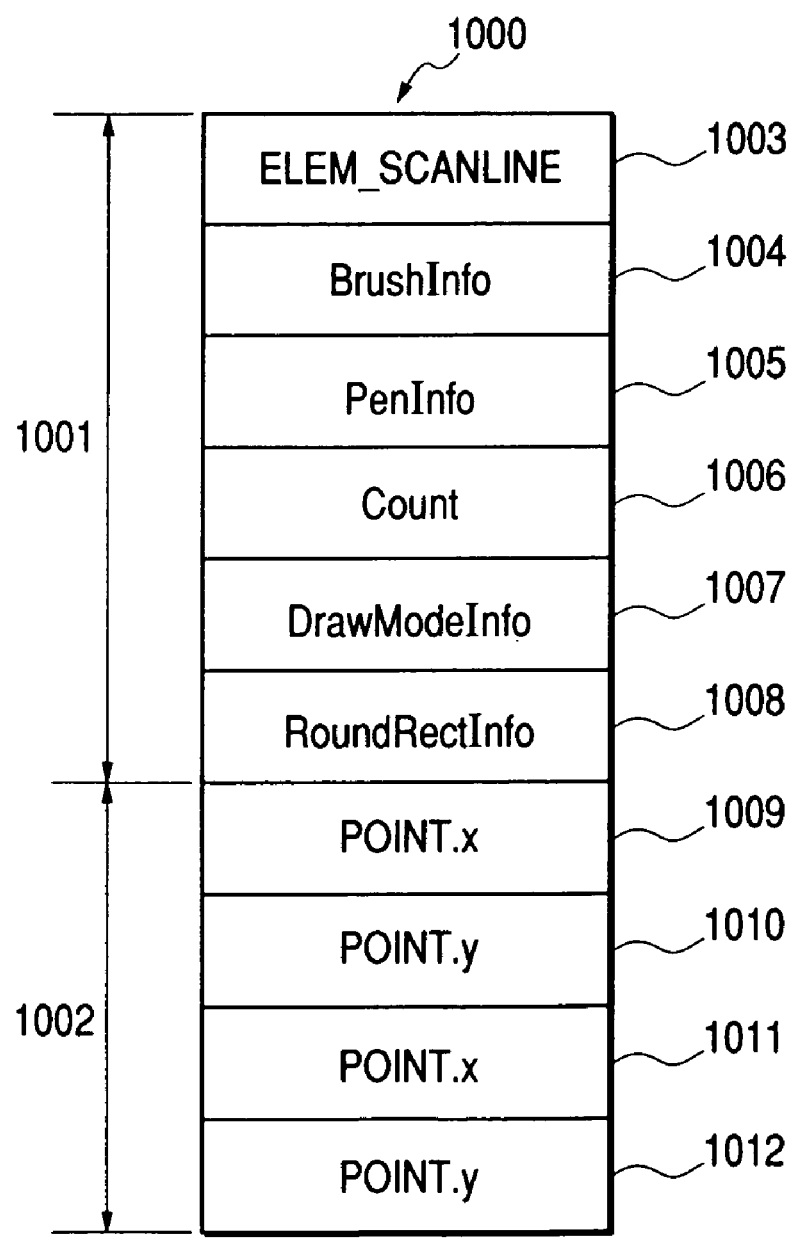
FIG. 10 is a diagram showing a PDF structure of a conventional Scanline draw command.

When a PDF is generated every DDI function by the printer driver 3023, a file of a data structure as shown at 1000 in FIG. 10 is generated. In the diagram, the file 1000 is constructed by a header portion 1001 and a data portion 1002. A data type 1003 is provided at the head of the header portion 1001. In addition to the data type, the header portion 1001 has brush information 1004, pen information 1005, a data size Count, logic arithmetic operation value 1006, circumscribed rectangle information 1007, and the like. The data portion 1002 is constructed by a POINT type structure array and the data has been stored in an array corresponding to the number (Count 1006).

Figure 4:
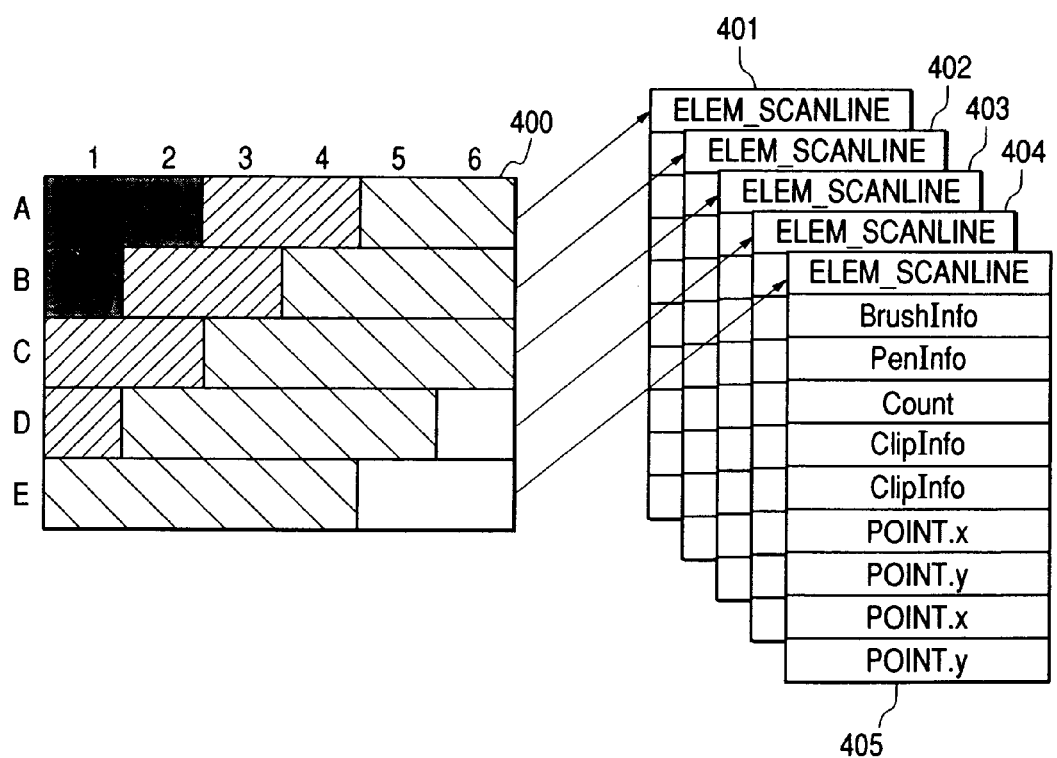
FIG. 4 is a schematic diagram showing a state where a header is added to each of RECTANGLE draw commands and the resultant draw commands are stored into a PDF.

However, if it is intended to draw gradation by the graphics system application and output it, there is a case where a large number of fine RECTANGLEs as shown at 400 in FIG. 4 are designated. That is, A row-[5 and 6] columns of 400 denotes 401, B row-[4 to 6] columns indicates 402, C row-[3 to 6] columns shows 403, . . . .

As mentioned above, if the rectangle draw command is held by a fine unit sent to the DDI function, a size of PDF increases and this results in reduction of the print speed in both PDL mode and image mode. In the embodiment, therefore, even if the DDI function is called, the printer driver 3023 does not immediately generate a PDF but executes a compressing process of the PDF by using the primary buffer 3024 as a memory space of a fixed size.

The primary buffer 3024 needs to be held in the page and has to be able to be accessed also from all DDI functions provided by the driver. "LPPDEVICE lpDestDev" has been stored in the first argument in all of the DDIs of Windows9X and indicates a pointer into a memory space held in one job. The pointer into the primary buffer is registered as a member.

The compressing process in the embodiment is mainly realized by a combination of the following two methods.

1) Reduction of the size and the number of commands by making the header portions common 2) Reduction of the data size by compression of the data portion Each method will be described in detail hereinbelow.

First, "1) Reduction of the size and the number of commands by making the header portions common" will be explained.

With respect to the finely divided draw commands of the same attributes, the size of PDF can be reduced by making the header information common.

The following members are necessary in order to compare the attributes with the previous draw attributes.

```
typedef struct
{
    enum ELEMTYPE lasDataType;
        //previous data type
    WORD lastPenIndex;
        //pen information of previous data
    WORD lastBrushIndex;
        //brush information of previous data
    DRAWMODE lastDrawMode;
        //DrawMode of previous data
    RECT lastboundRect;
        //circumscribed rectangle of previous data
    RECT BoundRect;
        //circumscribed rectangle of whole compression data
    LPSTR lpstart;
        //head pointer of compression data
    LPSTR lplast;
        //last pointer in present situation of compression data
    WORD bufsize;
        //primary buffer size
} LASTDATA;
```

In the DDI function which is provided by the printer driver, the previous data type set in LASTDATA mentioned above is compared with that of the present data. When both lasDataType coincide, a compression processing function per type is called. If they are different, a PDF is generated from the data in the primary buffer.

Figure 5:
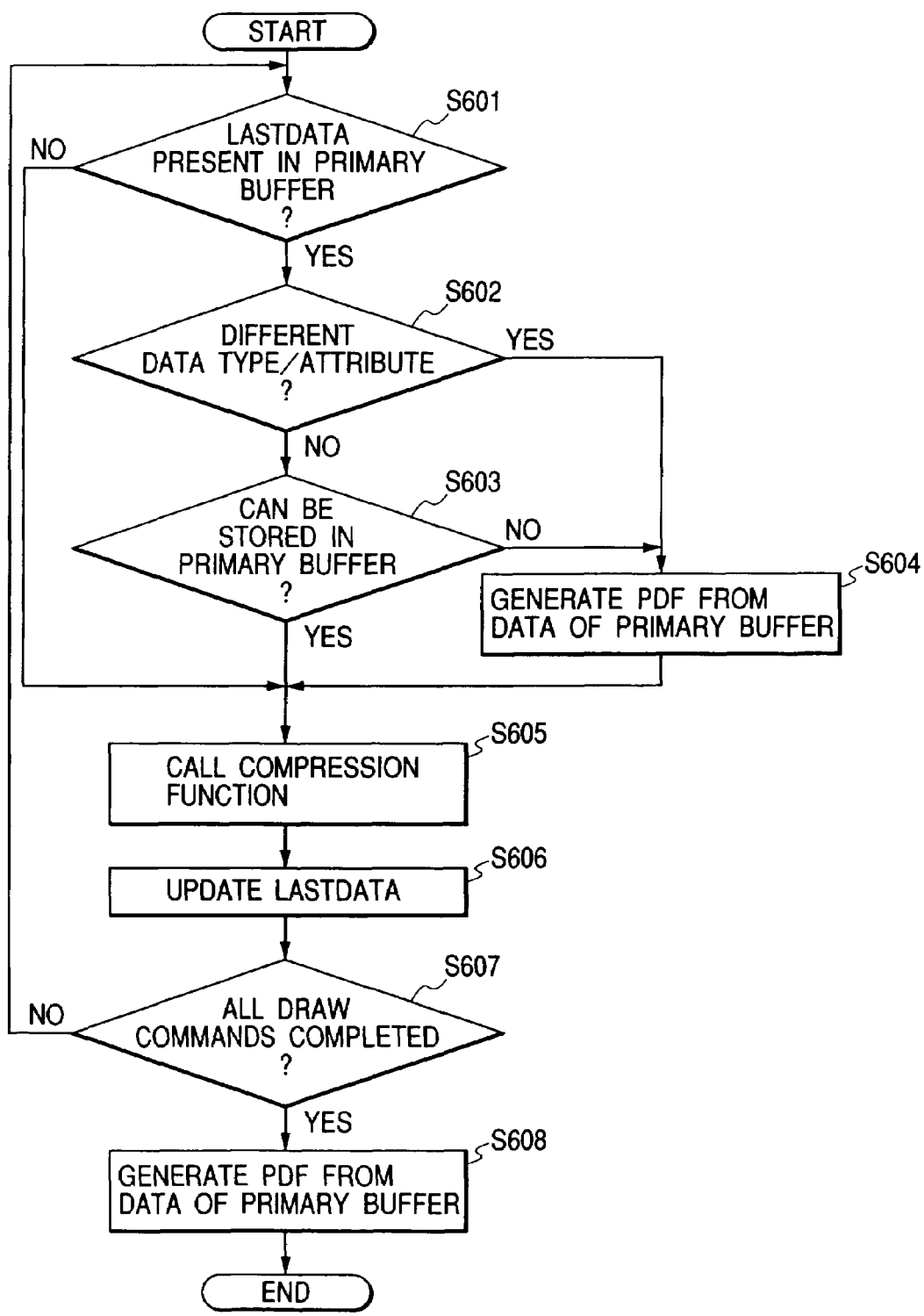
FIG. 5 is a flowchart showing a processing system in which headers of draw commands of the same draw attribute are made common.

FIG. 5 is a flowchart showing a flow for the above processes. Processing contents in the processing steps in FIG. 5 are as follows.

Step S601:

If no draw data are stored in the primary buffer, step S605 follows. If draw data is set in the primary buffer, a control routine advances to step S602.

Step S602:

If the type and attributes (brush, pen, logic arithmetic operation value) of the data are identical to those of the draw data stored in the primary buffer, step S603 follows. If they are different, the control routine advances to step S604.

Step S603:

If the data sent into the primary buffer can be stored, step S605 follows. If it is impossible, the control routine advances to step S604.

Step S604:

A PDF is generated from the draw data stored in the primary buffer, and the control routine advances to step S605.

Step S605:

The draw data sent to the current DDI function is transferred to a compression function per data type and set into the primary buffer. After that, the control routine advances to step S606.

Step S606:

LASTDATA is updated and the control routine advances to step S607.

lastDataType . . . Set if there is a change.
lastPenIndex . . . Set if there is a change.
lastBrushIndex . . . Set if there is a change.
lastDrawMode . . . Set if there is a change.
lastboundRect . . . Set a circumscribed rectangle of current draw command.
BoundRect . . . Get AND of previous BoundRect and current circumscribed rectangle.
lpstart . . . Head address in the primary buffer. No change.
lplast . . . Last pointer in which current data in the primary buffer has been stored.
bufsize . . . The data size stored at present is added.

Step S607:

If all draw commands are completed, step S608 follows. If NO, the control routine advances to step S601.

Step S608:

A PDF is generated from the draw data remaining in the primary buffer.

Figure 6:
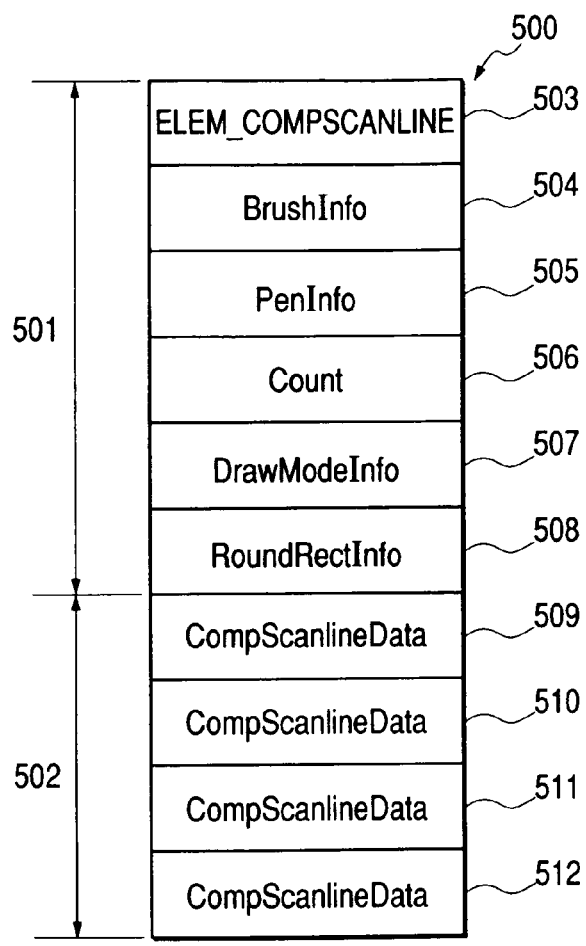
FIG. 6 is a schematic diagram showing a state where one header is added to a Scanline draw command which was divided into a plurality of parts and sent and the resultant draw command is stored in a PDF according to an embodiment.

FIG. 6 shows an example of the result obtained by the process in step S604 or S608.

Subsequently, "2) Reduction of the data size by compression of the data portion" will be described.

The compression function per data type which is called when the draw command of the same type as that of the draw command which has already been stored in the primary buffer 3024 is called executes a compressing process of the data portion by using continuity of a coordinate space or the like.

A specific example of a compressing method of Windows9X, Output (Scanline) will be explained.

1. With respect to a compressing algorithm of Output (Scanline)

Figure 7:
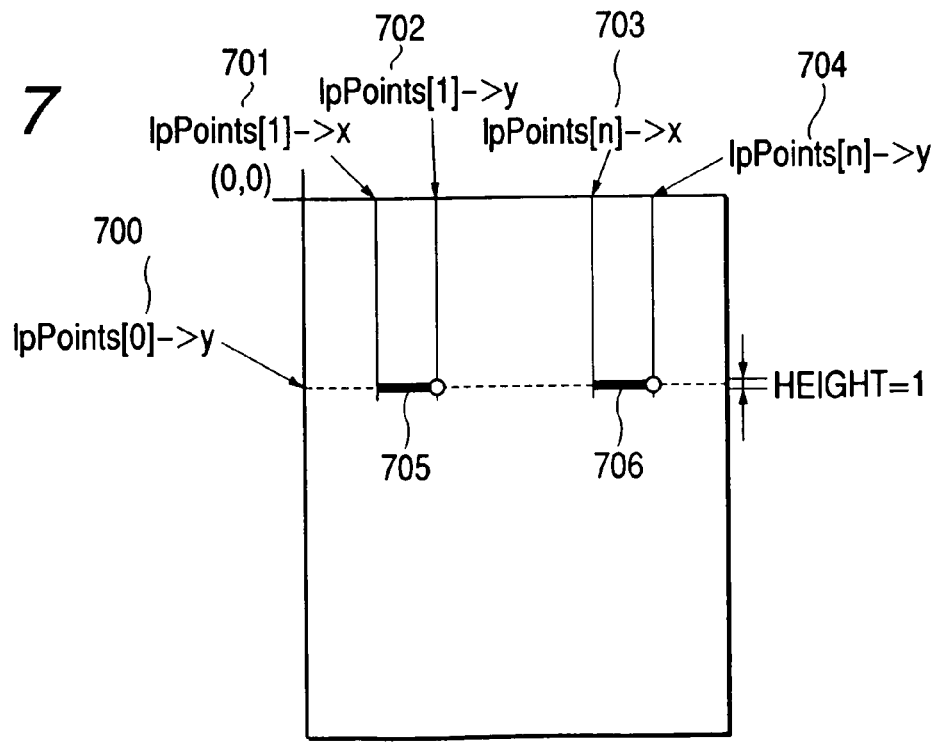
FIG. 7 is a schematic diagram sowing a relation between an Output function (Scanline) as one of Windows9X: DDI and parameters.

An output (Scanline) function will be described with reference to FIG. 7. As shown below, OS_SCANLINES has been set in the second argument of the Output function (mentioned above) as one of the DDI functions.

| Arguments | | |
|---|---|---|
| LPPDEVICE | lpDestDev | PDEVICE or PBITMAP |
| WORD | wStyle | OS_SCANLINES |
| WORD | wCount | Point number of the lpPoints argument |
| LPPOINT | lpPoints | Array of the start point and end point of the scanline |
| LPPPEN | lpPPen | Physical pen |
| LPPBRUSH | lpPBrush | Physical brush |
| LPDRAWMODE | lpDrawMode | Draw context |
| LPRECT | lpClipRect | Clip rectangle |

A POINT structure array on the destination side shown by lpPoints shows lpPoints [0]→y: Y coordinate
lpPoints [1]→x: Left coordinate
lpPoints [1]→y: Right coordinate Although wCount indicates the number of lpPoints arrays, when the number of scanlines is equal to 1, 2 is set. When it is equal to 2, 3 is set. When it is equal to n, n+1 is set.

Figure 8:
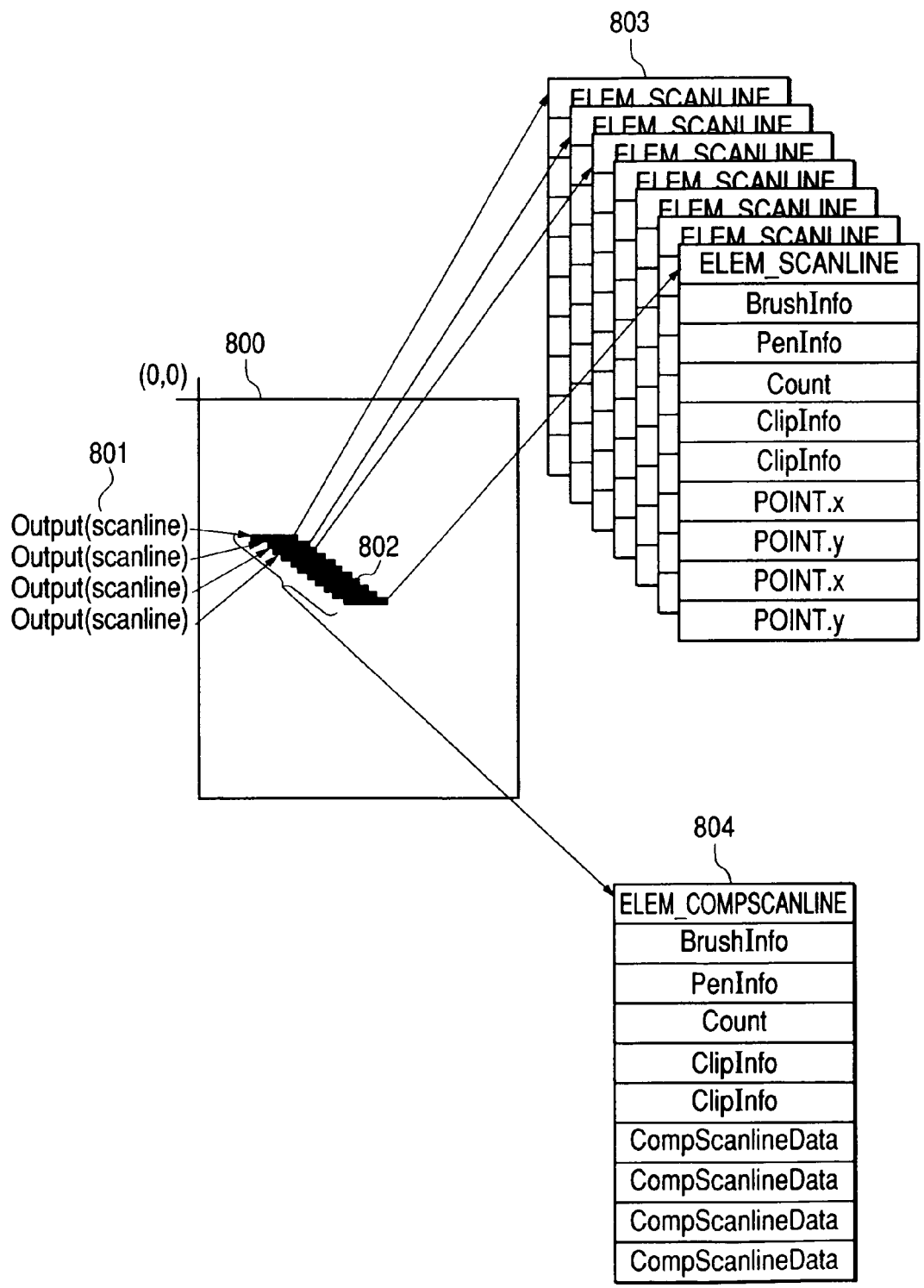
FIG. 8 is a schematic diagram showing a state where a figure is drawn by Scanline of Windows9X and a difference between a conventional PDF and the PDF according to the embodiment.

FIG. 8 is a schematic diagram showing a motion in the case where the compressing process is not executed when a Scanline drawing is designated plural times by the Output function and showing a motion in the case where the above two methods are combined. In case of drawing a figure 802 into a draw area 800, there is a case where Windows9X sequentially designates the Scanline drawing in the order from the small Y coordinate by using an Output function 801.

If a PDF 803 having one header for one Output function is generated, overlap data such as same brush or pen is registered many times.

Reference numeral 804 in FIG. 8 shows that the header size can be reduced by dealing with the information regarding the same brush, pen, and draw attributes as one header by the first method.

Further, if the Scanlines are in contact with each other as shown at 802 in FIG. 8, by the following method, the data size can be reduced to a size smaller than that in case of holding all coordinate information.

First, upon compression of the Scanline data, in addition to LASTDATA, the following members are held for management of the primary buffer.

typedef Struct
{
   WORD repetcnt; //the number of repetition times
   WORD lastY; //previous Y coordinate
   WORD lastLeftX; //previous left X coordinate
   WORD lastRightX; //previous right X coordinate
   WORD delLeftX; //variation of previous left X coordinate
   WORD delRightX; //variation of previous right X coordinate } CMPSCNLINES;

By storing the information of Scanline so far into CMPSCNLINES, commands shown in FIGS. 11 to 14 are generated.

A construction of command data will be explained. The command shows codes (0 to 12) provided for identifying the compressed data by using the most significant 4-bit portion in the COMPScanline data portion. A structure of the compressed data differs in dependence on a value of the code.

Figure 11:
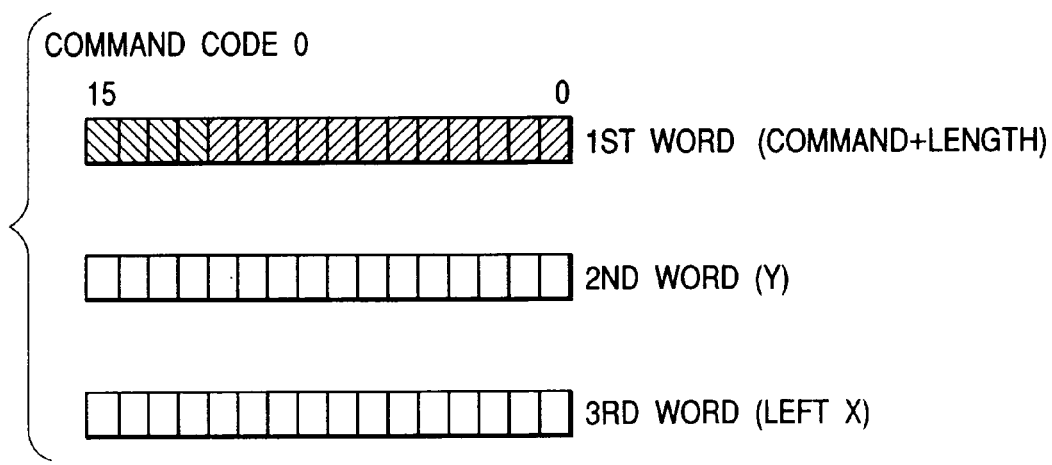
FIG. 11 is an explanatory diagram of a command which is used in the embodiment.

FIG. 11 shows the command code 0 (3-Word construction). The Y coordinate and the left X coordinate indicate parameters with signs. "with sign" denotes that the most significant bit indicates a code and the other bits indicate the values. The bits other than the sign bits indicate the absolute values.

Figure 12:
FIG. 12 is an explanatory diagram of a command which is used in the embodiment.

FIG. 12 shows the command codes 1 and 2 (1-Word construction). The command code 1 is used in the case where the previous coordinate data is compared with the current coordinate data, the Y coordinate variation is equal to +1, the left side coordinate is the same as the previous value, and the right side coordinate variation lies within a change range where it can be expressed by 11 bits. (Although the bit length is equal to 12, 1 bit is used for the code.)

Similarly, the command code 2 is used in the case where the Y coordinate variation is equal to +1, the right side coordinate is the same as the previous value, and the left side coordinate variation can be expressed by 11 bits.

Figure 13:
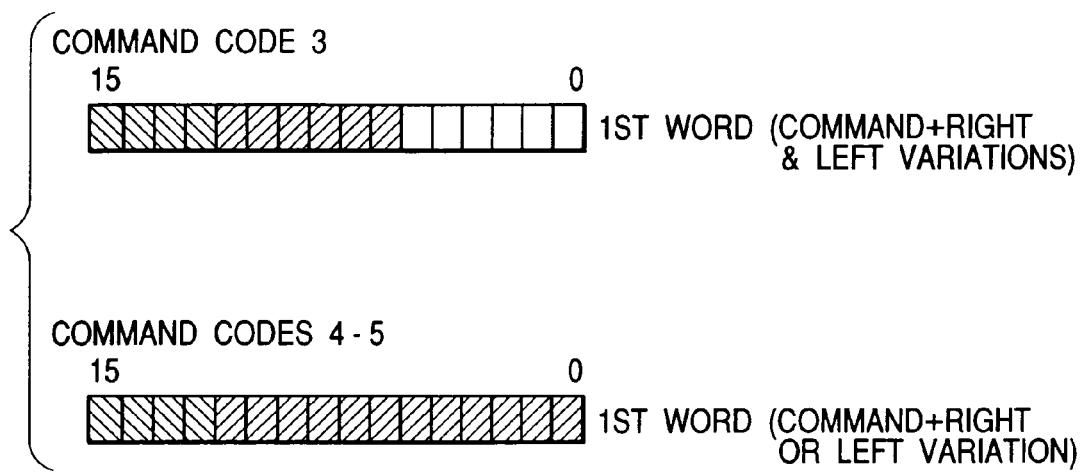
FIG. 13 is an explanatory diagram of a command which is used in the embodiment.

FIG. 13 shows the command codes 3 to 5 (1-Word construction). The command code 3 is used in the case where the previous coordinate data is compared with the current coordinate data, the Y coordinate variation is equal to +1 and the left and right coordinate variations lie within a change range where they can be expressed by 5 bits. (Although the bit length is equal to 6, 1 bit is used for the code.)

The command code 4 is used in the case where the previous coordinate data is compared with the current coordinate data, the Y coordinate variation is equal to −1 and the left side coordinate is the same as the previous value, and the right side coordinate variation lies within a change range where it can be expressed by 11 bits. (Although the bit length is equal to 12, 1 bit is used for the code.)

Similarly, the command code 5 is used in the case where the Y coordinate variation is equal to +1, the right side coordinate is the same as the previous value, and the left side coordinate variation can be expressed by 11 bits.

Figure 14:
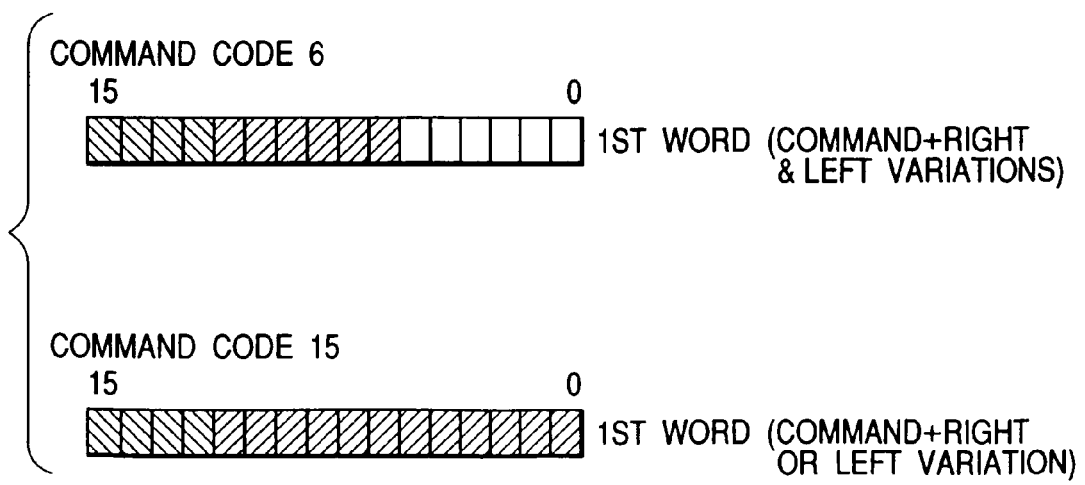
FIG. 14 is an explanatory diagram of a command which is used in the embodiment.

FIG. 14 shows the command codes 6 and 15 (1-Word construction). The command code 6 is used in the case where the previous coordinate data is compared with the current coordinate data, the Y coordinate variation is equal to −1 and the left and right coordinate variations lie within a change range where they can be expressed by 5 bits. (Although the bit length is equal to 6, 1 bit is used for the code.)

The command code 15 is used in the case where the command code number obtained by comparing the previous and current coordinate data is the same as the previous number and the continuation number can be expressed by 12 bits. When it is expressed by 12 or more bits, the command 0 is used and the reset of the initial coordinates is performed.

A command use example will now be described.

A compression command is fundamentally constructed by a continuation of "initial coordinates" and "variation command".

A command ejection example is shown below.

1. Vertical Straight Line

In case of a vertical straight line, it becomes "SCANLINE of a variation 0 which continues by a distance corresponding to its length".

Therefore, the commands become as follows.
"(No. 0) (initial coordinates)"
"(No. 15) (continuation number=length)"
"(No. 3) (left variation=0) (right variation=0)"

2. Oblique 45° Line

In case of an oblique 45° line, in many cases, the right and left variations are equal to 1.

Therefore, since it becomes "SCANLINE of a variation 1 which continues by a distance corresponding to its length", the commands become as follows.
"(No. 0) (initial coordinates)"
"(No. 15) (continuation number=length)"
"(No. 3) (left variation=1) (right variation=1)"

3. Oblique Line

In general oblique lines, a change of each SCANLINE is variable.

Therefore, a command is issued each time the variation changes. The commands become as follows.
"(No. 0) (initial coordinates)"
"(No. 3) (left variation) (right variation)"
"(No. 3) (left variation) (right variation)"
"(No. 3) (left variation) (right variation)"

Figure 9:
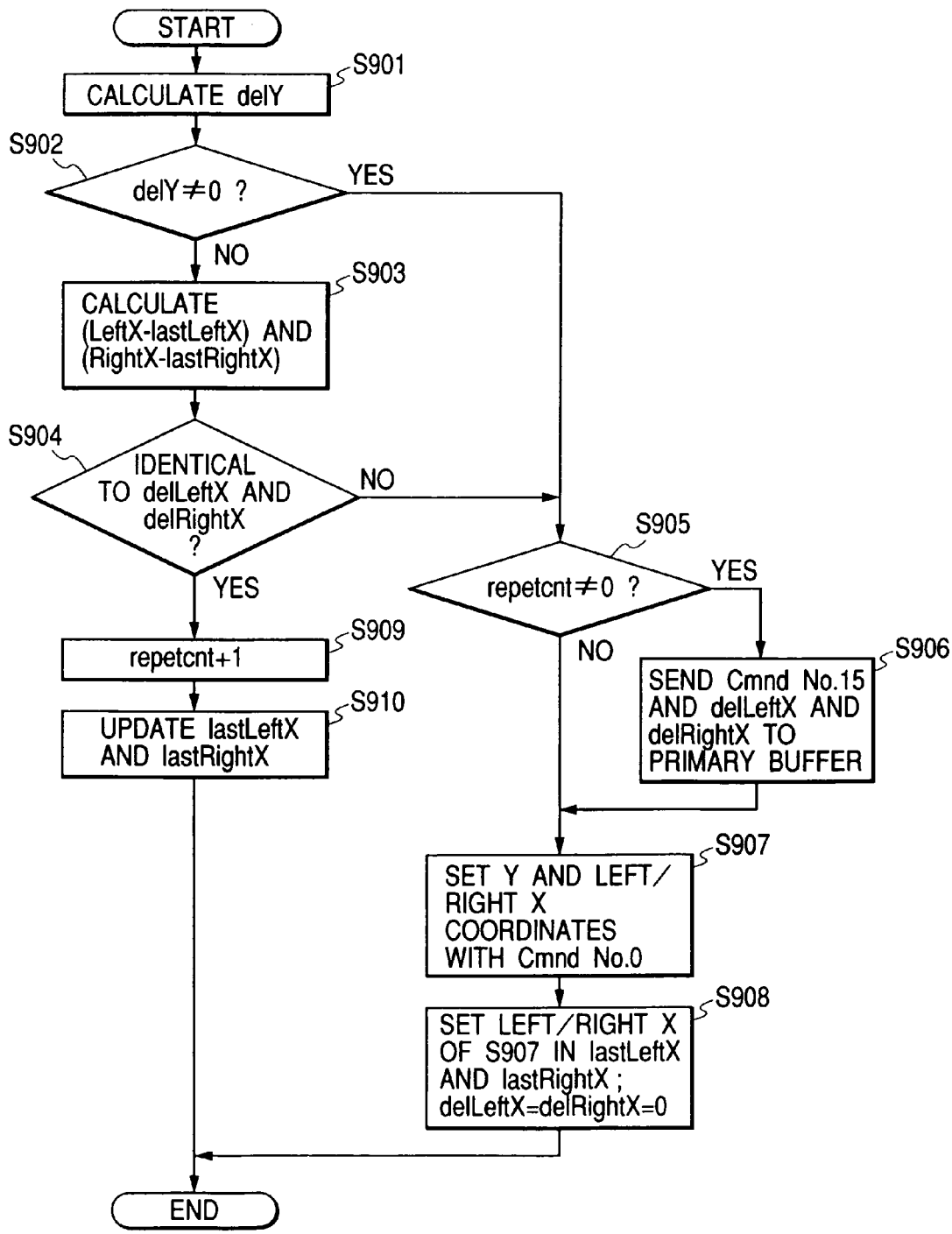
FIG. 9 is a flowchart showing a procedure for compressing Scanline data sent by another function.

FIG. 9 is a flowchart showing a flow for the above command generating process. Processing contents in the steps in FIG. 9 are as shown below.

Step S901:

A variation delY between the Y coordinate LastY of the previous Scanline data stored in a primary cache and the Y coordinate of the current Scanline is obtained (delY=0 when the data is not stored in the primary cache).

Step S902:

If delY is equal to a value other than 0, step S905 follows. If it is equal to 0, the control routine advances to step S903.

Step S903:

A variation between the left X and lastLeftX of the current Scanline and a variation between the right X and lastRightX of the current Scanline are obtained.

Step S904:

If the variations on both right and left side are equal to previous variations delLeftX and delRightX, step S909 follows. If at least one of them differs, the control routine advances to step S905.

Step S905:

If a repetition counter repetcnt indicates 0, step S906 follows. Unless otherwise, the control routine advances to step S907.

Step S906:

A continue command (CmndNo. 15) is buffered into the primary buffer 3024, subsequently, the commands showing delLeftX and delRightX are buffered, and the control routine advances to step S907.

Step S907:

By a new coordinate command (CmndNo. 0), the Y coordinate and the right and left X coordinates are buffered into the primary buffer 3024, and the control routine advances to step S908.

Step S908:

The left and right X coordinates set in step S907 are set into lastLeftX and lastRight X, and delLeftX and delRightX are initialized to 0.

Step S909:

The repetition counter repetcnt is counted up and the control routine advances to step S910.

Step S910:

lastLeftX and lastRightX are updated.

The invention can be applied to a system comprising a plurality of apparatuses (for example, a host computer, an interface device, a reader, a printer, and the like) or can be also applied to an apparatus comprising one device (for example, a copying apparatus, a facsimile apparatus, or the like).

Naturally, the object of the invention can be also accomplished by a method whereby a memory medium in which software program codes called a printer driver for realizing the functions of the embodiment mentioned above have been recorded is supplied to a system or an apparatus, and a computer (or a CPU or an MPU) of the system or apparatus reads out and executes the program codes stored in the memory medium.

In this case, the program codes themselves read out from the memory medium realize the functions of the embodiment mentioned above. The memory medium in which the program codes have been stored constructs the invention.

As a memory medium for supplying the program codes, for example, it is possible to use a floppy disk, a hard disk, an optical disk, a magnetooptic disk, a CD-ROM, a CD-R, a CD-RW, a DVD-ROM, a DVD-RAM, a magnetic tape, a non-volatile memory card, an ROM, or the like.

The invention incorporates not only a case where a computer executes the read-out program codes, so that the functions of the embodiment mentioned above are realized, but also a case where the OS (Operating System) or the like which operates on the computer executes a part or all of the actual processes on the basis of instructions of the program codes and the functions of the embodiment mentioned above are realized by those processes.

Further, the invention also incorporates a case where the program codes read out from the memory medium are written into a memory equipped for a function expanding board inserted in a computer or a function expanding unit connected to a computer and, thereafter, a CPU or the like equipped for the function expanding board or function expanding unit executes a part or all of the actual processes on the basis of instructions of the program codes and the functions of the embodiment mentioned above are realized by those processes.

In case of applying the invention to the memory medium, the program codes corresponding to the flowcharts described above are stored in the memory medium.

Obviously, the invention can be also applied to a case where the program codes of software for realizing the functions of the embodiment mentioned above are recorded into a memory medium, and a program is distributed from the memory medium to a requestor through a communication line such as personal computer communication or the like.

The program codes themselves which are installed into a computer in order to realize the functions and processes of the invention by the computer also realize the invention. That is, the computer program itself for realizing the functions and processes of the invention is also incorporated in claims of the invention.

As a method of supplying the computer program, the invention is not limited to a case where it is stored into an FD or a CD-ROM and read out by a computer and installed therein but can be also applied to a case where a client computer is connected to a homepage of the Internet by using a browser of the client computer, the computer program itself of the invention is downloaded from the homepage, or a compressed file including an automatic installing function, thereby supplying the computer program. The supplying method of the computer program can be also realized by dividing the program codes constructing the program of the invention into a plurality of files and downloading each file from a different homepage. That is, a WWW server for allowing a program file to realize the functions and processes of the invention by a computer to be downloaded to a plurality of users is also incorporated in claims of the invention.

The program of the invention is enciphered, stored into a memory medium such as an FD or the like, and distributed to the users, key information to decrypt the encryption is downloaded to the users who satisfy predetermined conditions from the homepage through the Internet, and by using the key information, the enciphered program is executed and installed into a computer, thereby enabling the program to be realized.

As many apparently widely different embodiments of the present invention can be made without departing from the spirit and scope thereof, it is to be understood that the invention is not limited to the specific embodiments thereof except as defined in the appended claims.

As described above, according to the invention, in case of temporarily spooling the intermediate language by the printer driver, the high speed print can beperformed by suppressing the size and the number of holding data. That is, even if the drawing of the same figure is designated by another function by the OS, the high speed printing process can be performed by suppressing the number of spool objects and the spool data size.

What is claimed is:

1. An information processing apparatus that has a printer driver, said apparatus comprising:

primary buffer means for storing print command information input from an operation system to the printer driver;

memory means for storing one page of intermediate language data generated based on the print command information stored in said primary buffer means;

command decreasing means for, upon storing of the one page of intermediate language data in said memory means, if an attribute of print command information which has already been stored in said primary buffer means is identical to that of newly input print command information, generating new print command information based on the already stored print command information and the newly input print command information and allowing one page of intermediate language data generated based on the generated information to be stored in said memory means; and print job generation means for generating a job for a printer based on the one page of intermediate language data stored in said memory means, wherein a number of commands of the new print command information generated by said command decreasing means is smaller than a total number of commands of the already stored print command information and the newly input print command information.

2. An apparatus according to claim 1, wherein when new print command information based on the newly input print command information and the already stored print command information is not generated by said command decreasing means, intermediate language data is generated from the already stored print command information and, thereafter, the newly input print command information is stored into said primary buffer means.

3. An apparatus according to claim 1, wherein said print command information is supplied by executing a predetermined application program, intermediate languages corresponding to one page are held on the basis of said print command information, and thereafter, the print command for the printer is generated.

4. An apparatus according to claim 3, wherein the print command is transmitted to the printer through a predetermined communication medium.

5. An apparatus according to claim 1, wherein said command decreasing means collects the print command information having the same attribute as a common header, thereby reducing an amount of data by an amount corresponding to a header size.

6. An apparatus according to claim 1, wherein:

said command decreasing means comprises:

means for obtaining draw coordinate variations of a draw object which has been held previously and a draw object which is being processed at present; and means for counting up a repetition variable in the case where said variation is the same as the previous one, and when said variation is different from the previous one, a command showing the variation and a count number indicative of the repetition variable is stored into said memory means, and subsequently, a command indicative of absolute coordinates of the draw object which is being processed at present is stored into said memory means.

7. An information processing method in an information processing apparatus that has a printer driver, the method comprising:

a first storing step of storing, in primary buffer means, print command information input from an operation system to the printer driver;

a second storing step of storing, in a memory, one page of intermediate language data generated based on the print command information stored in said first storing step;

a command decreasing step of, when the one page of intermediate language data is stored in said second storing step, if an attribute of the print command information which has already been stored in said first storing step is identical to that of newly input print command information, generating new print command information based on the already stored print command information and the newly input print command information and allowing one page of intermediate language data generated based on the generated information to be stored in said memory; and generating a print job for a printer based on the one page of intermediate language data stored in the memory, wherein a number of commands of the new print command information generated in the command decreasing step is smaller than a total number of commands of the already stored print command information and the newly input print command information.

8. A method according to claim 7, wherein when new print command information based on the newly stored print command information and the already stored print command information is not generated in said command decreasing step, intermediate language data is generated from the already stored print command information and, thereafter, the newly input print command information is stored into the primary buffer means.

9. A method according to claim 7, wherein the print command information is supplied by executing a predetermined application program, intermediate languages corresponding to one page are held on the basis of the print command information, and thereafter, the print command for the printer is generated.

10. A method according to claim 9, wherein the print command is transmitted to the printer through a predetermined communication medium.

11. A method according to claim 7, wherein in said command decreasing step, the print command information having the same attribute is collected as a common header, thereby reducing an amount of data by an amount corresponding to a header size.

12. A method according to claim 7, wherein:

said command decreasing step comprises:

a step of obtaining draw coordinate variations of a draw object which has been held previously and a draw object which is being processed at present; and a step of counting up a repetition variable in the case where said variation is the same as the previous one, and when said variation is different from the previous one, a command showing the variation and a count number indicative of the repetition variable is stored into said memory, and subsequently, a command indicative of absolute coordinates of the draw object which is being processed at present is stored into said memory.

13. A computer-readable memory medium in which a program for controlling an information processing apparatus having a printer driver has been stored as a readable program, said program comprising:

a first storing step of storing, in primary buffer means, print command information input from an operation system to the printer driver;

a second storing step of storing, in a memory, one page of intermediate language data generated based on the print command information stored in said first storing step; and a command decreasing step of, when the one page of intermediate language data is stored in said second storing step, if an attribute of the print command information which has already been stored in said first storing step is identical to that of newly input print command information, generating new print command information based on the already stored print command information and the newly input print command information and allowing one page of intermediate language data generated based on the generated information to be stored in said memory; and generating a print job for a printer based on the one page of intermediate language data stored in the memory, wherein a number of commands of the new print command information generated in the command decreasing step is smaller than a total number of commands of the already stored print command information and the newly input print command information.

14. A medium according to claim 13, wherein when new print command information based on the newly stored print command information and the already stored print command information is not generated in said command decreasing step, intermediate language data is generated from the already stored print command information and, thereafter, the newly input print command information is stored into the primary buffer means.

15. A medium according to claim 13, wherein the print command information is supplied by executing a predetermined application program, intermediate languages corresponding to one page are held on the basis of the print command information, and thereafter, the print command for the printer is generated.

16. A medium according to claim 15, wherein the print command is transmitted to the printer through a predetermined communication medium.

17. A medium according to claim 13, wherein in said command decreasing step, the print command information having the same attribute is collected as a common header, thereby reducing an amount of data by an amount corresponding to a header size.

18. A medium according to claim 13, wherein:
said command decreasing step comprises:
a step of obtaining draw coordinate variations of a draw object which has been held previously and a draw object which is being processed at present; and
a step of counting up a repetition variable in the case where said variation is the same as the previous one,
and when said variation is different from the previous one, a command showing the variation and a count number indicative of the repetition variable is stored into said memory, and subsequently, a command indicative of absolute coordinates of the draw object which is being processed at present is stored into said memory.

19. A print control program embodied in a computer-readable medium for controlling an information processing apparatus having a printer driver, said program comprising:
a first storing step of storing, in primary buffer means, print command information input from an operation system to the printer driver;

a second storing step of storing, in a memory, one page of intermediate language data generated based on the print command information stored in said first storing step; and a command decreasing step of, when the one page of intermediate language data is stored in said second storing step, if an attribute of the print command information which has already been stored in said first storing step is identical to that of newly input print command information, generating new print command information based on the already stored print command information and the newly input print command information and allowing one page of intermediate language data generated based on the generated information to be stored in said memory; and generating a print job for a printer based on the one page of intermediate language data stored in the memory, wherein a number of commands of the new print command information generated in the command decreasing step is smaller than a total number of commands of the already stored print command information and the newly input print command information.

20. A program according to claim 19, wherein when new print command information based on the newly stored print command information and the already stored print command information is not generated in said command decreasing step, intermediate language data is generated from the already stored print command information and, thereafter, the newly input print command information is stored into the primary buffer means.

21. A program according to claim 19, wherein the print command information is supplied by executing a predetermined application program, intermediate languages corresponding to one page are held on the basis of the print command information, and thereafter, the print command for the printer is generated.

22. A program according to claim 21, wherein the print command is transmitted to the printer through a predetermined communication medium.

23. A program according to claim 19, wherein in said command decreasing step, the print command information having the same attribute is collected as a common header, thereby reducing an amount of data by an amount corresponding to a header size.

24. A program according to claim 19, wherein:
said command decreasing step comprises:
a step of obtaining draw coordinate variations of a draw object which has been held previously and a draw object which is being processed at present; and
a step of counting up a repetition variable in the case where said variation is the same as the previous one,
and when said variation is different from the previous one, a command showing the variation and a count number indicative of the repetition variable is stored into said memory, and subsequently, a command indicative of absolute coordinates of the draw object which is being processed at present is stored into said memory.

* * * * *

UNITED STATES PATENT AND TRADEMARK OFFICE
CERTIFICATE OF CORRECTION

PATENT NO. : 7,023,579 B2
APPLICATION NO. : 09/779642
DATED : April 4, 2006
INVENTOR(S) : Masanari Toda It is certified that error appears in the above-identified patent and that said Letters Patent is hereby corrected as shown below:

COLUMN 4
Line 4, "sowing" should read --showing--.

COLUMN 14
Line 55, "beperformed" should read --be performed--.

Signed and Sealed this

Twenty-sixth Day of December, 2006

JON W. DUDAS
*Director of the United States Patent and Trademark Office*